(12) United States Patent  (10) Patent No.: US 8,149,576 B2
Tanaka et al.  (45) Date of Patent: Apr. 3, 2012

(54) INFORMATION PROCESSING UNIT

(75) Inventors: Shintaro Tanaka, Osaka (JP); Hitoshi Nakatani, Osaka (JP); Haruka Kaneko, Kyoto (JP); Yoshiaki Nagamura, Osaka (JP)

(73) Assignee: Panasonic Corporation, Osaka (JP)

( * ) Notice: Subject to any disclaimer, the term of this patent is extended or adjusted under 35 U.S.C. 154(b) by 131 days.

(21) Appl. No.: 12/541,474

(22) Filed: Aug. 14, 2009

(65) Prior Publication Data

US 2010/0046166 A1 Feb. 25, 2010

(30) Foreign Application Priority Data

Aug. 22, 2008 (JP) ................................. 2008-214398

(51) Int. Cl.
 *G06F 1/16* (2006.01)
(52) U.S. Cl. .................. 361/679.56; 15/144.1; 362/583; 248/304
(58) Field of Classification Search ............. 250/370.08, 250/370.09; 361/679.21, 679.02, 679.59, 361/679.27, 679.33, 679.31, 679.46; 15/323, 15/329, 97.1, 144.1, 28, 23; 472/118; 455/575.8, 455/575.9, 550.1; 359/461; 399/90, 110, 399/262; 362/202, 231, 583; 16/422, 430, 16/436, 441; 248/220.42, 304, 243
See application file for complete search history.

(56) References Cited

U.S. PATENT DOCUMENTS

| 2008/0030946 A1* | 2/2008 | Lee .............................. 361/685 |
| 2010/0038549 A1* | 2/2010 | Nishino et al. ........... 250/370.09 |
| 2010/0296235 A1* | 11/2010 | Takemasa et al. ....... 361/679.21 |

FOREIGN PATENT DOCUMENTS

| JP | 05-075274 | 3/1993 |
| JP | 06-089124 | 3/1994 |
| JP | 2007-127736 | 5/2007 |
| JP | 2007-241511 A | 9/2007 |

* cited by examiner

*Primary Examiner* — Hung Duong
(74) *Attorney, Agent, or Firm* — Hamre, Schumann, Mueller & Larson, P.C.

(57) ABSTRACT

Since an information processing unit of the present invention includes a protrusion portion on a back face side of a first casing, it is possible to reduce an impact transmitted to a notebook PC when the notebook PC is placed in an upright position on the surface of a desk. Therefore, it is possible to prevent the notebook PC from being damaged. Furthermore, since the protrusion portion is provided to the back face side of the first casing, it is possible not to allow the notebook PC to stand self-supported in an upright position. Therefore, the notebook PC will not be placed carelessly in an upright position on the surface of a desk or the like; thus, it is possible to prevent the PC from being broken or damaged due to a fall.

4 Claims, 6 Drawing Sheets

INFORMATION PROCESSING UNIT

BACKGROUND OF THE INVENTION

1. Field of the Invention

The present invention relates to a portable information processing unit such as a notebook personal computer (hereinafter, referred to as a notebook PC).

2. Description of Related Art

Conventional notebook PCs are equipped with a rubber foot made of rubber or a resin having elastomeric properties in order to absorb an impact applied when being placed on a desk or the like. Also, when a face of a notebook PC placed on a desk or the like is referred to as a bottom face, and a side including a pivot shaft for opening and closing a display portion is referred to as a back face, the rubber feet have an effect of absorbing an impact and minimizing damage to a casing when the PC suddenly is dropped in the direction of the bottom face or the back face. JP 2007-241511 discloses an information processing unit including a rubber foot.

However, conventional notebook PCs often are configured so as to have a flat casing back face portion. For example, as shown in FIG. 6, a notebook PC 100 is self-supporting when being arranged so as to stand upright on a desk or the like. Since a casing back face portion 100a of the notebook PC 100 has a small contact area, a position when the PC stands self-supported is unstable. Therefore, if the notebook PC 100 suffers a small disturbance, the PC will fall in the direction of a top face of a second casing 102 (a casing including a liquid crystal display) as indicated by arrow Y or in the direction of a bottom face of a first casing 101 (a casing including a keyboard) as indicated by arrow X. As a result, the notebook PC may be broken or damaged.

SUMMARY OF THE INVENTION

Therefore, with the foregoing in mind, it is an object of the present invention to provide an information processing unit that may not be broken or damaged due to a fall by providing a configuration that does not allow the unit to be stood self-supported in an upright position.

An information processing unit of the present invention includes a casing that contains an information processing means, a handle side face of the casing on which a handle is disposed, and an opposite side face that is opposite the handle side face. The opposite side face includes a first protrusion portion.

According to the present invention, the information processing unit will not be carelessly arranged in an upright position in a self-supporting manner. Thus, it is possible to prevent the unit from being broken or damaged due to a fall. It should be noted that the present invention is particularly useful for a notebook PC with a handle.

DETAILED DESCRIPTION OF THE INVENTION

Hereinafter, the present invention will be described by way of illustrative embodiments with reference to the drawings.

An information processing unit of the present invention includes a casing that contains an information processing means, a handle side face of the casing on which a handle is disposed, and an opposite side face that is opposite the handle side face. The opposite side face includes a first protrusion portion.

The information processing unit of the present invention may be embodied as in the following with the above-described configuration as the basic configuration.

The information processing unit of the present invention can be configured so as to include a foot portion on a bottom face that is adjacent to each of the handle side face and the opposite side face and can be configured such that the foot portion extends up to the opposite side face, and the first protrusion portion is formed integrally with the foot portion. With this configuration, it is possible to reduce the number of components so as to realize a cost reduction.

Moreover, the information processing unit of the present invention can be configured so as to include further a second protrusion portion on the opposite side face and can be configured such that the second protrusion portion is formed so as to have a height from the opposite side face smaller than the first protrusion portion.

Moreover, the information processing unit of the present invention can be configured so as to further include an operation portion disposed on a top face opposite the bottom face of the casing. The operation portion allows an operation for inputting information to the information processing means to be performed, a second casing on which a display portion that displays information input with the operation portion, and a pivot shaft that supports the casing and the second casing such that the casing and the second casing can be opened and closed, and the information processing unit can be configured such that the first protrusion portion and the handle are disposed on the casing, and the second protrusion portion is disposed on a cover that covers the pivot shaft. With this configuration, when the opposite side face side of the casing is placed on a desk, in the case in which an excessive impact that cannot be absorbed by the first protrusion portion is applied to the casing, the second protrusion portion disposed on the cover comes into contact with a surface on which the information processing unit is placed; thus, it is possible to suppress damage to the pivot shaft.

Embodiment

Figure 1:
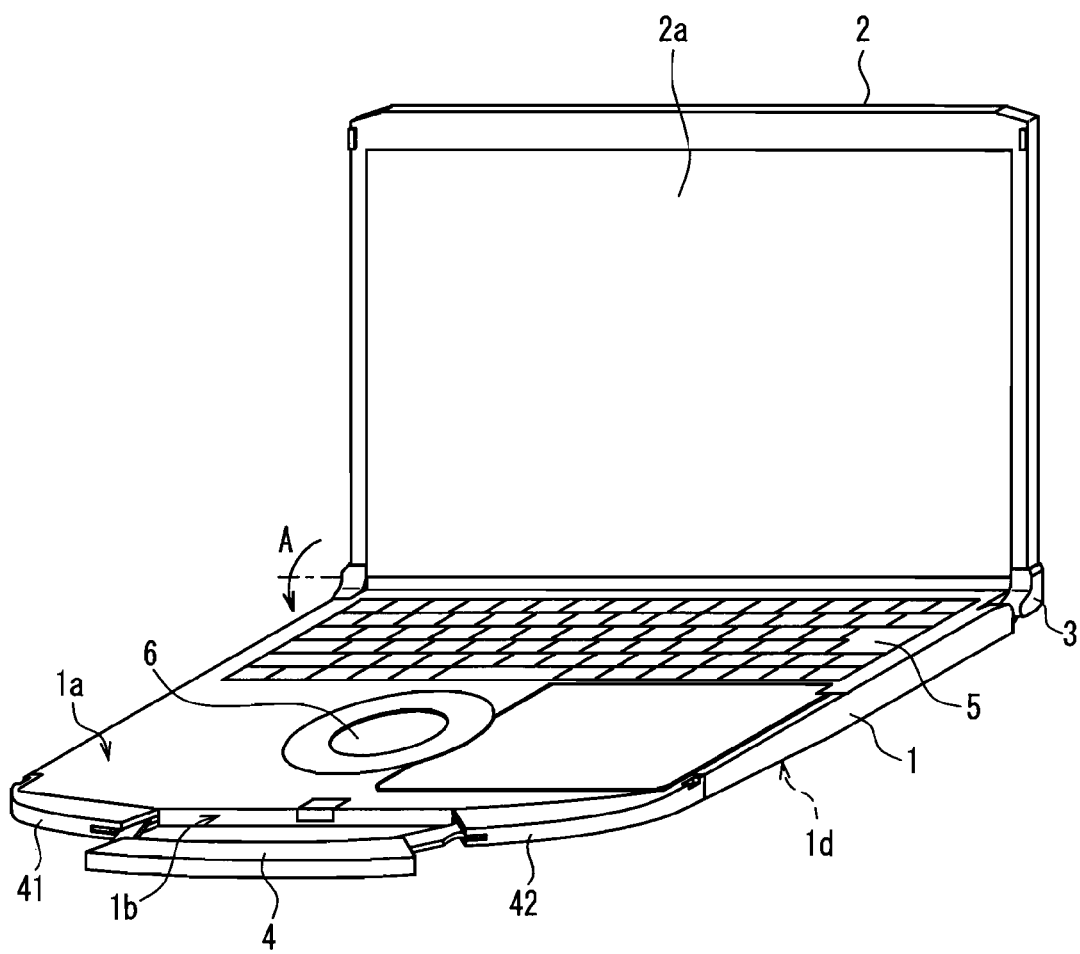
FIG. 1 is a perspective view of an information processing unit (in a first state) in an embodiment.

FIG. 1 is a perspective view showing an external view of an information processing unit of the present embodiment and shows a first state of a notebook PC that is an example of an information processing unit. It should be noted that although the present embodiment is described using a notebook PC as an example of an information processing unit, such an information processing unit is sufficient as long as the unit is at least a portable information processing unit, such as a portable telephone terminal or a medical device.

Figure 3:
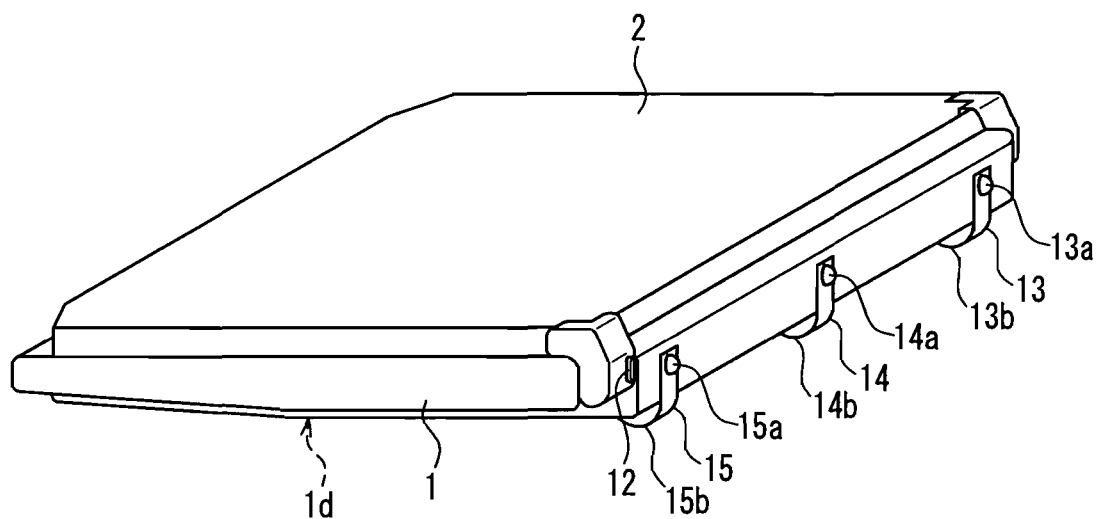
FIG. 3 is a perspective view of the information processing unit (in the second state) in an embodiment.

As shown in FIG. 1, the notebook PC includes a first casing 1 and a second casing 2. The first casing 1 contains a circuit board on which various electrical elements are mounted, a hard disk drive, and the like. The second casing 2 includes a liquid crystal display 2a. The first casing 1 and the second casing 2 are supported by a hinge portion (not shown) contained by a hinge cover 3 so as to be pivotable with respect to each other. The second casing 2 can shift to a second state in which the liquid crystal display 2a closely faces a keyboard 5 by being pivoted in the direction indicated by arrow A from a position shown in FIG. 1 (the first state). The hinge cover 3 pivots as shown in FIG. 3 in synchronization with a pivot operation in the first state and the second state. When a face of the first casing that faces the second casing in the second state is defined as a "top side", a top face 1a of the first casing 1 includes the keyboard 5 and a pointing device 6. An operation for inputting various characters can be performed with the keyboard 5. An operation for moving a cursor displayed on the liquid crystal display 2a to a desired position can be performed with the pointing device 6. Further, when a handle 4 side is defined as a "front side" in the second state, support members 41 and 42 that support the handle 4 are fixed on a lateral face 1b on the front side of the first casing 1 (hereinafter, referred to as a front face of the first casing).

A user can hold the handle 4 with their hand. The user can hand-carry the notebook PC by holding the handle 4 with their hand. Both ends in the long side direction of the handle 4 are supported by the support members 41 and 42, respectively.

Figure 2:
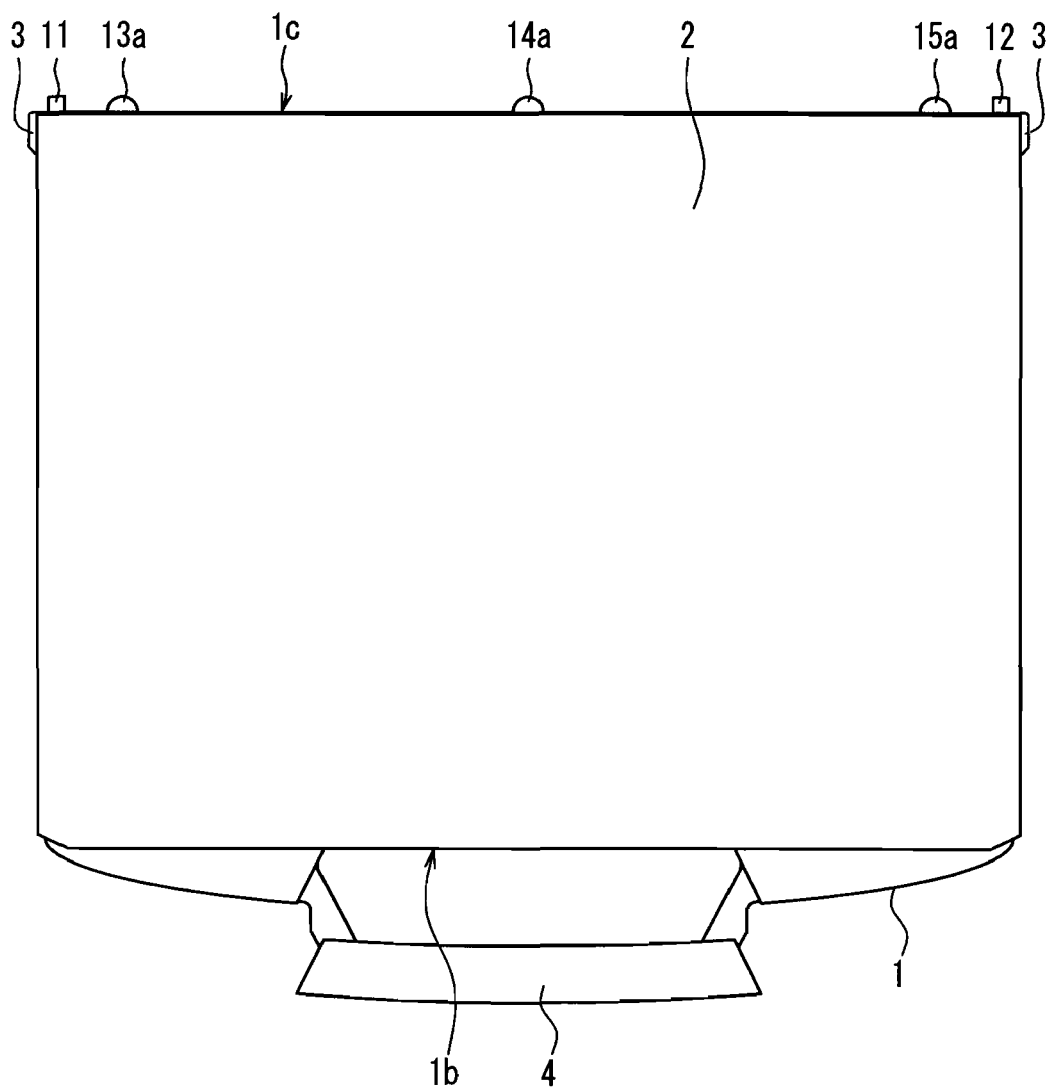
FIG. 2 is a plan view of the information processing unit (in a second state) in an embodiment.

FIG. 2 is a plan view of the information processing unit in the second state. FIG. 3 is a perspective view of the information processing unit in the second state. The hinge cover 3 covers the hinge portion that axially supports the first casing 1 and the second casing 2 such that the casings are pivotable. The hinge covers 3 include protrusion portions 11 and 12, respectively. The hinge cover 3 preferably is formed of an elastic material such as a resin having elastomeric properties. The hinge cover 3 preferably is formed of internally plasticized polybutylene terephthalate, for example. The protrusion portions 11 and 12 are formed of an elastic material. The protrusion portions 11 and 12 preferably are formed of the same material as that of the hinge cover 3. When the hinge portion side is defined as a "back face side" with respect to the front face on the handle 4 side, the protrusion portions 11 and 12 are formed on the hinge cover 3 in a protruding manner, in the second state, in the direction orthogonal to a face on a back face 1c side of the first casing 1. The back face 1c side of the first casing 1 includes foot portions 13, 14, and 15. The foot portions 13 and 15 are disposed in the vicinity of both ends of the hinge portion. The foot portion 14 is disposed in an approximately intermediate position between the foot portion 13 and the foot portion 15. The foot portions 13, 14, and 15 are formed of an elastically deformable material. The foot portions 13, 14, and 15 are preferably formed of a rubber or a resin having elastomeric properties. The foot portions 13, 14, and 15 are disposed on the back face 1c and a bottom face 1d of the first casing 1. Substantially semi-globular protrusion portions 13a, 14a, and 15a are integrally formed on a face of the foot portions 13, 14, and 15 on the back face 1c side, respectively.

The protrusion portions 13a, 14a, and 15a are protruding from the foot portions 13, 14, and 15, respectively, in the direction substantially orthogonal to the back face 1c. Further, the protrusion portions 13a, 14a, and 15a have approximately the same height from the back face 1c, and are linearly formed substantially parallel to the top face 1a of the first casing 1. Note that protrusion portions 13a, 14a, and 15a are formed so as to have a height from the back face 1c higher than the height of the protrusion portions 11 and 12. Moreover, protrusion portions 13b, 14b, and 15b integrally are formed on a face of the foot portions 13, 14, and 15 on the bottom face 1d side, respectively.

The protrusion portions 13b, 14b, and 15b are protruding from the foot portions 13, 14, and 15, respectively, in the direction substantially orthogonal to the bottom face 1d. When the notebook PC is placed on a surface of a desk in a position in which the bottom face 1d thereof faces the surface of the desk, the protrusion portions 13b, 14b, and 15b reduce an impact generated by the PC coming into contact with the surface of the desk and transmitted to the notebook PC.

Figure 4:
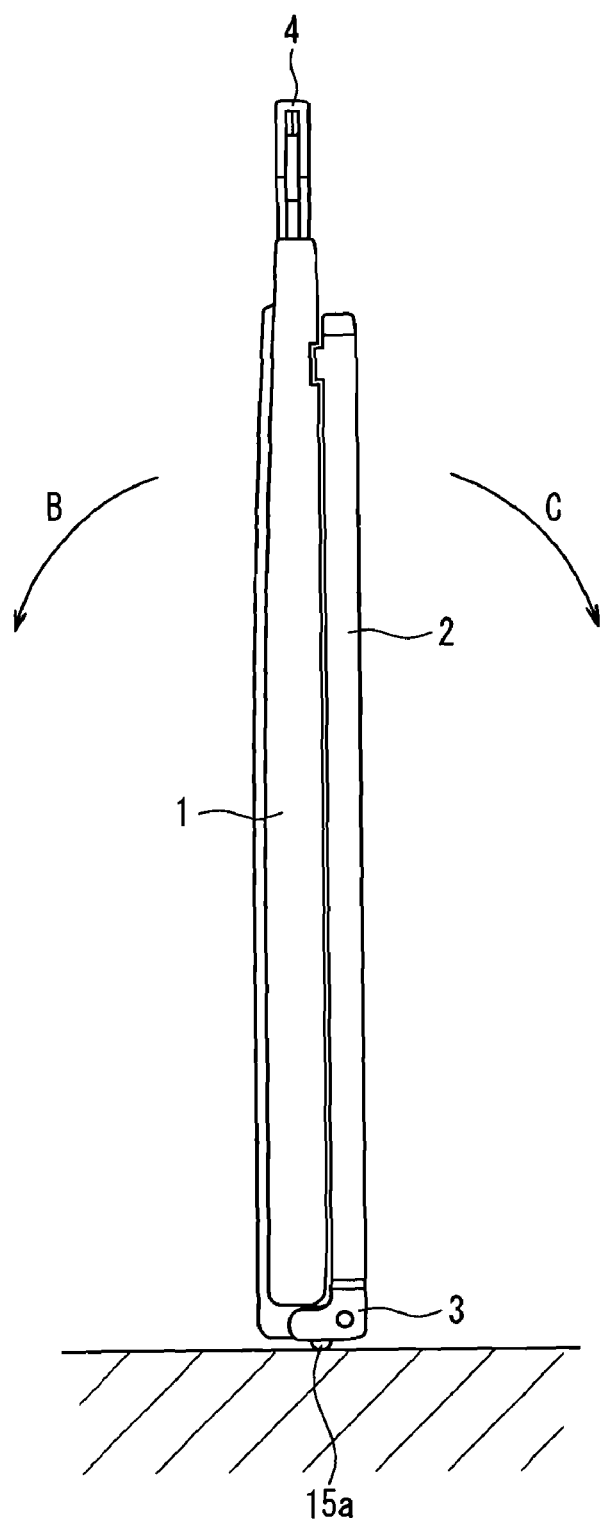
FIG. 4 is a side view of the information processing unit in an upright position in an embodiment.

FIG. 4 illustrates is a state in which an attempt is made to stand the notebook PC in the second state of the present embodiment in an upright position on the surface of a desk by the handle 4 being held. As shown in FIG. 4, when an attempt is made to stand the notebook PC of the present embodiment in an upright position on the surface of a desk, the substantially semi-globular protrusion portions 13a, 14a, and 15a formed on the back face 1c side of the first casing 1 come into contact with the surface of the desk. Accordingly, the notebook PC cannot stand self-supported and tends to fall in the direction indicated by arrow B or C. For example, when the user carries the notebook PC by holding the handle 4 with their hand and then tries to place the PC on the desk in an upright position as shown in FIG. 4, the notebook PC tends to easily fall. Therefore, in order to avoid an impact from being applied to the notebook PC due to a fall, it is necessary for the user to intentionally displace the notebook PC in the direction indicated by arrow B or C (normally, in the direction indicated by arrow B in which the bottom face 1d faces the surface of the desk) from the state as shown in FIG. 4.

Further, although an impact is applied to the back face side of the notebook PC when the user places the notebook PC in the position as shown in FIG. 4 on the surface of the desk by holding the handle 4, since the protrusion portions 13a, 14a, and 15a disposed on the back face 1c of the first casing 1 come into contact with the surface of the desk, it is possible to absorb an impact applied to the first casing 1 in a state in which the notebook PC is held by the handle 4.

Note that the above-described impact applied when the back face 1c side of the first casing 1 of the notebook PC is placed on the desk with the handle 4 being held applies an impact to the second casing 2 as an inertial force. The impact due to the inertial force may be applied to the hinge portion, and may cause a problem in the pivot operation of the first casing 1 and the second casing 2. As described above, although the protrusion portions 13a, 14a, and 15a provided to the back face 1c of the first casing 1 absorb an impact force. The protrusion portions 11 and 12 disposed on the hinge covers 3 come into contact with a surface on which the notebook PC is placed when the impact is excessive; thus, it is possible to suppress damage to the hinge portion.

Figure 5:
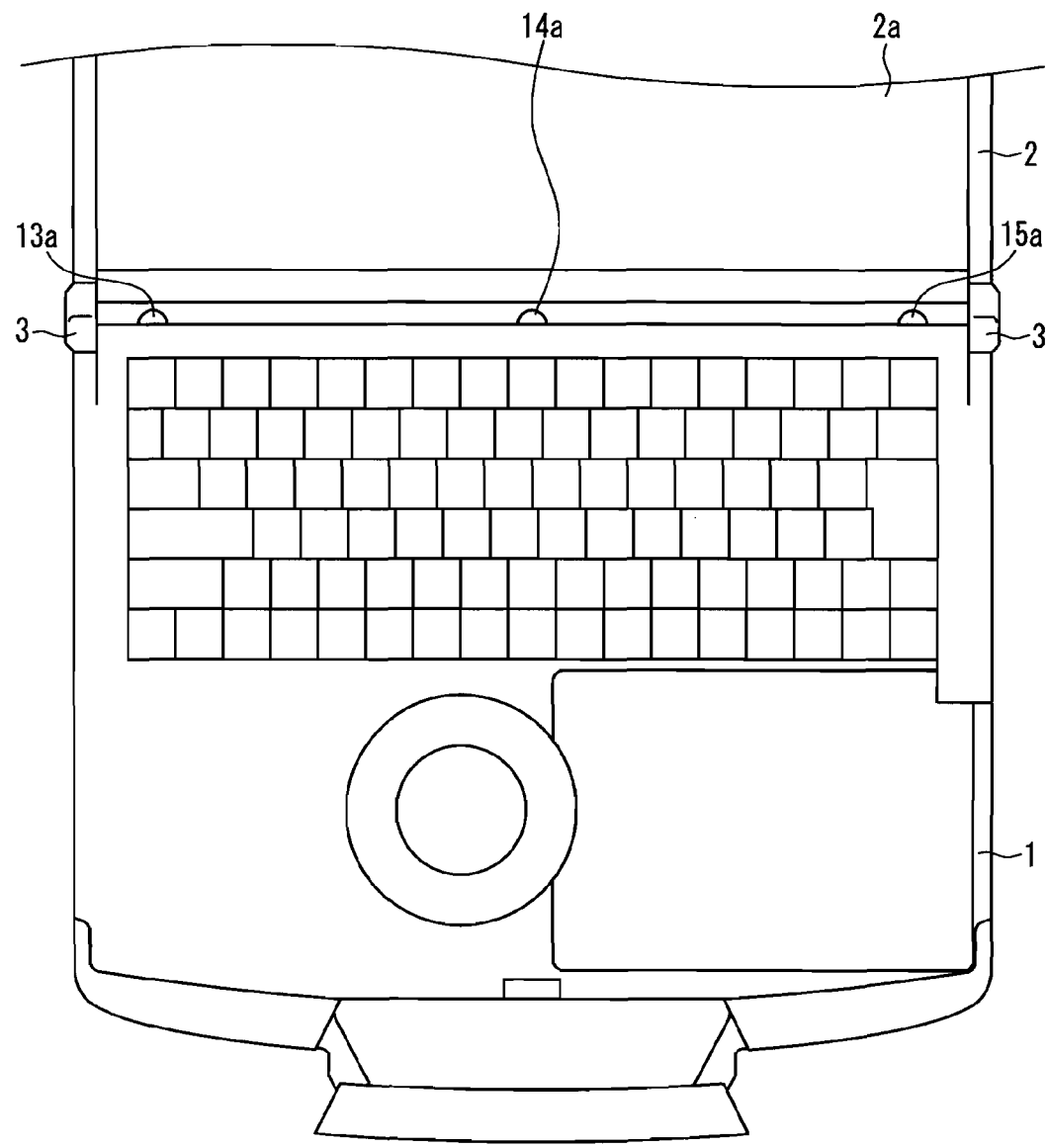
FIG. 5 is a plan view of the information processing unit (in the first state) in an embodiment.
Figure 6:
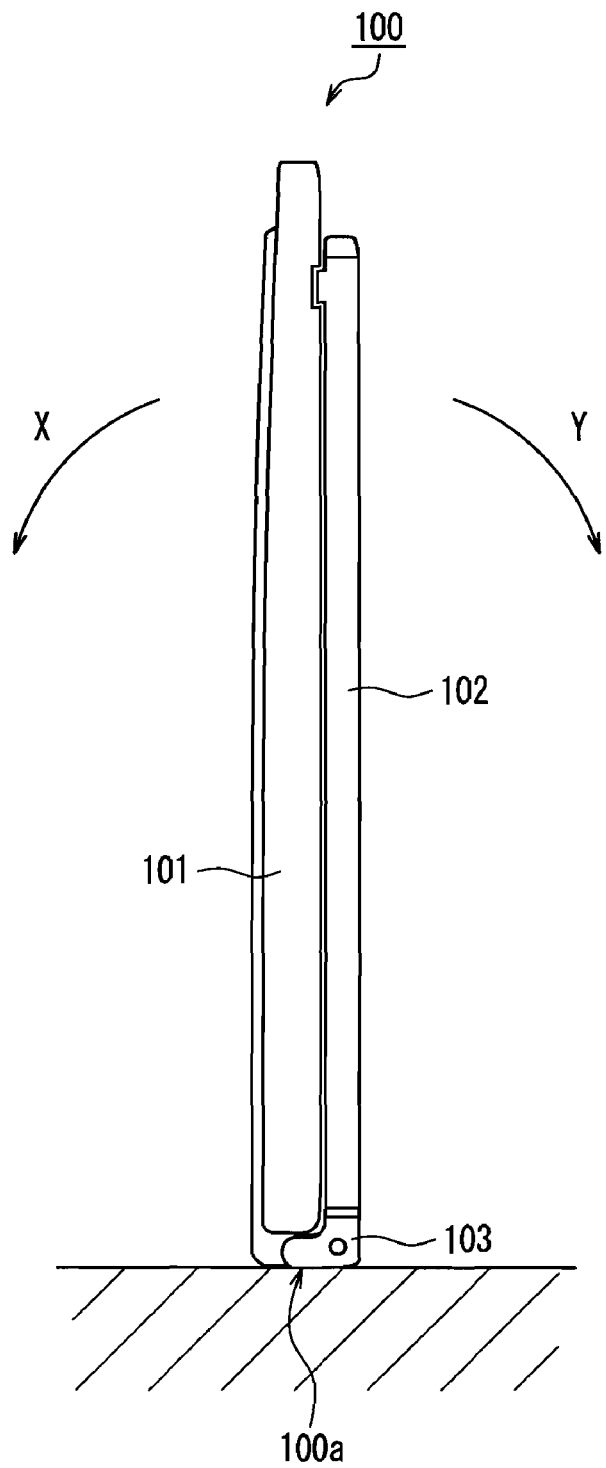
FIG. 6 is a side view of a conventional processing unit in an upright position.

FIG. 5 is a plan view of a relevant part of the notebook PC in the present embodiment. The protrusion portions 13a, 14a, and 15a have a height that allows the portions to fit into a gap 16 between the first casing 1 and the second casing 2 when the second casing 2 is pivoted so as to be separated from the first casing 1. With this configuration, by the protrusion portions 13a, 14a, and 15a coming into contact with the second casing 2 in the gap 16, an excessive pivot operation of the second casing 2 can be prevented and, also, the pivot angle of the second casing 2 can be limited within a predetermined range.

According to the present embodiment, since the protrusion portions 11, 12, 13a, 14a, and 15a are provided on the back face 1c side of the first casing 1, when the notebook PC is placed on the surface of the desk, for example, in an upright position as shown in FIG. 4, it is possible to reduce the impact transmitted to the notebook PC. Therefore, it is possible to prevent the notebook PC from being damaged.

Furthermore, since the protrusion portions 13a, 14a, and 15a are provided on the back face 1c side of the first casing 1, it is possible not to allow the notebook PC to stand self-supported in an upright position as shown in FIG. 4, for example. Consequently, the notebook PC will not be placed carelessly in an upright position on the surface of the desk or the like; thus, it is possible to prevent the PC from being broken or damaged due to a fall.

Furthermore, it is possible to control the direction in which the notebook PC falls according to the positions or sizes of the protrusion portions 13a, 14a, and 15a when an attempt is made to place the PC in an upright position on the surface of a desk or the like. For example, when the first casing 1 has an impact resistance superior to that of the second casing 2, it is possible to cause the notebook PC to fall in the direction in which the first casing 1 comes into contact with the surface of the desk (the direction indicated by arrow B in FIG. 4) by the protrusion portions 13a, 14a, and 15a being arranged in positions on the back face 1c close to the second casing 2, or by an inclined face being provided at the tips of the protrusion portions 13a, 14a, and 15a.

Furthermore, the protrusion portions 13a, 14a, and 15a are formed integrally with the foot portions 13, 14, and 15, respectively; thus, it is possible to reduce the number of components so as to realize a cost reduction.

Furthermore, the protrusion portions 11 and 12 are formed integrally with the hinge covers 3, respectively; thus, it is possible to reduce the number of components so as to realize a cost reduction.

Note that although the protrusion portions 13a, 14a, and 15a are substantially semi-spherical in the present embodiment. It is possible to form the portions in another shape as long as the portions at least project from the back face 1c of the first casing 1, and the shape does not allow the notebook PC to stand self-supported in an upright position. For example, the protrusion portions 13a, 14a, and 15a can be semi-cylindrical, conical, or the like.

Furthermore, although the amounts that the protrusion portions 13a, 14a, and 15a project from the back face 1c of the first casing 1 are the same in the present embodiment, for example, the amount of only the protrusion portion 14a protruding can be made smaller than the amounts of the protrusion portions 13a and 15a protruding. When this configuration is adopted, for example, an impact applied when the notebook PC is placed on the desk with the handle 4 being held is received by the protrusion portions 13a and 15a first and then by the protrusion portion 14a that has a small protruding amount. Specifically, the protrusion portions 13a and 15a are absorbing impact, next the protrusion portion 14a is absorbing impact. Thus, it is possible to increase an impact absorbable effect. Note that it is possible to make the amount of the protrusion portion 14b protruding from the bottom face 1d of the first casing 1 smaller than the amount of the protrusion portions 13b and 15b protruding from the bottom face id of the first casing 1. Accordingly, it is possible to receive an impact force applied when the PC is placed on the surface of the desk with the two-step configuration; thus, it is possible to increase an impact absorbable effect.

Further, although a case in which three protrusion portions 13a, 14a, and 15a are disposed as a first protrusion portion provided to the back face 1c opposite the front face 1b of the first casing 1 in the present embodiment has been described, the number of the first protrusion portions is not limited to three. When at least one first protrusion portion is provided, the function can be filled. However, since an impact absorbable effect and an effect to suppress excessive pivoting of the second casing 2 can be enhanced with a greater number of first protrusion portions, it is preferable to dispose at least a pair of the first protrusion portions or more, on both ends of the hinge portion.

When the number of the first protrusion portions is three or more, and the amounts of the protrusion portions protruding are the same, it is necessary to linearly dispose each protrusion portion. Although a line along which the protrusion portions 13a, 14a, and 15a are arranged is parallel to the top face 1a of the first casing 1 in the present embodiment, it is not necessary to make the line parallel thereto.

Furthermore, the protrusion portions 11 and 12 in the present embodiment are examples of a second protrusion portion of the present invention. The protrusion portions 13a, 14a, and 15a in the present embodiment are examples of the first protrusion portion of the present invention. The front face 1b in the present embodiment is an example of a handle side face of the present invention. The back face 1c in the present embodiment is an example of an opposite side face of the present invention. The hinge cover 3 in the present embodiment is an example of a cover of the present invention. The keyboard 5 and the pointing device 6 in the present embodiment are examples of an operation portion of the present invention.

An information processing unit of the present invention is useful for a portable information processing unit such as a notebook PC.

The following appendixes are disclosed regarding the present embodiment.

(Appendix 1)

An information processing unit, includes:

a casing that contains an information processing means;

a handle side face of the casing on which a handle is disposed; and an opposite side face that is opposite the handle side face, wherein the opposite side face includes a first protrusion portion.

(Appendix 2)

The information processing unit according to appendix 1, may include a foot portion on a bottom face that is adjacent to each of the handle side face and the opposite side face, wherein the foot portion extends up to the opposite side face, and the first protrusion portion is integrally formed with the foot portion.

(Appendix 3)

The information processing unit according to appendix 1 or 2, further may include a second protrusion portion on the opposite side face, wherein the second protrusion portion is formed so as to have a height from the opposite side face smaller than the first protrusion portion.

(Appendix 4)

The information processing unit according to any one of appendixes 1 to 3, further may include:

an operation portion disposed on a top face opposite the bottom face of the casing, the operation portion allowing an operation for inputting information to the information processing means to be performed;

a second casing on which a display portion that displays information input with the operation portion; and a pivot shaft that supports the casing and the second casing such that the casing and the second casing can be opened and closed, wherein the first protrusion portion and the handle are disposed on the casing, and the second protrusion portion is disposed on a cover that covers the pivot shaft.

The invention may be embodied in other forms without departing from the spirit or essential characteristics thereof.

The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An information processing unit, comprising:
   a casing that contains an information processing means;
   a handle side face of the casing on which a handle is disposed; and
   an opposite side face that is opposite the handle side face,
   wherein the opposite side face includes a first protrusion portion.

2. The information processing unit according to claim 1, comprising a foot portion on a bottom face that is adjacent to each of the handle side face and the opposite side face, wherein the foot portion extends up to the opposite side face, and the first protrusion portion is formed integrally with the foot portion.

3. An information processing unit, comprising:
   a casing that contains an information processing means;
   a handle side face of the casing on which a handle is disposed; and
   an opposite side face that is opposite the handle side face,
   wherein the opposite side face includes a first protrusion portion; and
   a second protrusion portion on the opposite side face, wherein the second protrusion portion is formed so as to have a height from the opposite side face smaller than the first protrusion portion.

4. The information processing unit according to claim 3, further comprising:
   an operation portion disposed on a top face opposite the bottom face of the casing, the operation portion allowing an operation for inputting information to the information processing means to be performed;
   a second casing on which a display portion that displays information input with the operation portion; and a pivot shaft that supports the casing and the second casing such that the casing and the second casing can be opened and closed,
   wherein the first protrusion portion and the handle are disposed on the casing, and the second protrusion portion is disposed on a cover that covers the pivot shaft.

* * * * *